United States Patent
Thomas

[15] 3,698,815
[45] Oct. 17, 1972

[54] EXPOSURE LAMP ALIGNMENT EQUIPMENT

[72] Inventor: Herbert Thomas, Miami, Fla.

[73] Assignee: Copystatics Manufacturing Corporation, Miami Lakes, Fla.

[22] Filed: Nov. 20, 1970

[21] Appl. No.: 91,269

[52] U.S. Cl. .................356/121, 250/217, 355/8, 355/68, 356/222, 356/226
[51] Int. Cl. .................................................G01j 1/100
[58] Field of Search.............356/121, 123, 222, 226; 355/68, 69, 8; 250/205, 217

[56] References Cited

UNITED STATES PATENTS

| | | | |
|---|---|---|---|
| 3,506,352 | 4/1970 | Denner | 356/222 |
| 3,533,705 | 10/1970 | Fukushima | 356/222 |
| 3,524,391 | 8/1970 | Fujii | 356/222 |
| 2,996,952 | 8/1961 | Orlando | 355/68 |
| 2,090,825 | 8/1937 | Anthony, Jr. et al. | 355/68 |
| 3,170,367 | 2/1965 | Wick | 250/217 |
| 3,423,153 | 1/1969 | Kent | 355/68 |
| 3,438,704 | 4/1969 | Schoen | 355/68 |
| 3,479,119 | 11/1969 | Miller et al. | 355/68 |
| 3,522,991 | 8/1970 | Bowen | 355/68 |
| 3,563,143 | 2/1971 | Peterson | 355/68 |

FOREIGN PATENTS OR APPLICATIONS

| | | | |
|---|---|---|---|
| 1,135,521 | 12/1956 | France | 355/68 |

Primary Examiner—Ronald L. Wibert
Assistant Examiner—J. Rothenberg
Attorney—Amster & Rothstein

[57] ABSTRACT

Apparatus for facilitating the alignment of the exposure lamps in a copying machine. A test fixture is insertable in each machine before it is fully assembled but after the exposure lamp assembly has been put in place. A series of photocell-actuated meters provides a visual indication of the light intensity pattern at the exposure window, the lamp assembly being adjusted by an operator until uniform meter readings are observed. By aligning each assembly after it is mounted in a machine, rather than pre-aligning each assembly and then placing it in a machine, misalignments which arise during assembly are eliminated. The test fixture itself includes a self-calibration unit.

43 Claims, 23 Drawing Figures

PATENTED OCT 17 1972

INVENTOR.
HERBERT THOMAS
BY
Amster Rothstein
ATTORNEYS

EXPOSURE LAMP ALIGNMENT EQUIPMENT

This invention relates to copying machines, and more particularly to equipment for aligning the exposure lamps used in copying machines.

In a popular type of copying machine, an original document to be copied is moved past a scanning window while a sheet of copy paper is moved past an exposure window. Light from one or more exposure lamps is directed to the scanning window, and is reflected from the original document toward the copy paper. The light exposes the copy paper as is known in the art, this being a necessary step in the overall copying process.

It is important that a completely white original document result in a uniform light intensity pattern through all sections of the exposure window. Without such uniformity, different sections of each copy made by the machine will be noticeably different; the effect is similar to an underexposed or over-exposed streak on photographic film. In the assembly of a copying machine, various adjustments are made to achieve a uniform light intensity pattern at the exposure window.

Generally, in accordance with prior art teachings, each lamp assembly is mounted in an alignment fixture having a simulated exposure window. The reflectors in the lamp assembly and the bulbs in the reflectors are then adjusted until they produce a uniform light intensity pattern. The light intensity pattern is measured by placing a series of photocells across the simulated exposure window, and adjusting the lamp assembly until the photocell outputs indicate that a balance has been achieved.

Following the alignment of each lamp assembly, the lamp assembly is placed in a copying machine on the production line. It has been found, however, that during mounting in a machine there is a great probability that a pre-aligned lamp assembly will become misaligned. In such a case, it is necessary to re-align the assembly, often with considerable difficulty if it is attempted to do so without removing the lamp assembly from the machine.

It is a general object of my invention to provide more efficient exposure lamp alignment equipments for copying machines.

In accordance with the principles of my invention, an exposure lamp assembly is mounted in each machine before it is aligned. A test fixture is then attached to the machine, the test fixture having a series of photocells which is placed across the width of the actual exposure window of the machine. The test fixture is temporarily mounted in the machine before the machine assembly is complete; the test fixture is mounted to the rear of the exposure window in a region in which the components to be mounted have not yet been assembled. Following the alignment of the lamp assembly, the test fixture is removed and the assembly of the rest of the machine is completed. Because the lamp assembly is aligned only after it is already in place in the machine, there is no need for a second alignment routine in the manufacture of any single machine.

The operator adjusts the lamp assembly to achieve a uniform illumination pattern for many different shutter openings to insure that the machine will operate properly in the field no matter what the exposure control setting. To insure that each photocell gather the light impinging upon a relatively large rectangular section of the exposure window — even if the shutter opening is very large — a shared Fresnel lens and an additional lens for each photocell are utilized.

The photocell characteristics are not linear and their outputs do not change equally for identical input changes. For this reason, and because for ease of adjustment it is desirable to have all of the meters controlled by the photocells provide readings within the same fixed tolerance marks in the balanced condition, the same total amount of light is made to impinge upon each photocell no matter what the shutter opening. This is achieved with the use of two additional photocells in a feed-back configuration; the greater the shutter opening, the smaller the light output from the lamp assembly.

The test apparatus itself includes self-calibration equipment so that bias adjustments for meters which are fed by the photocell outputs may be made whenever photocells are replaced and so that the test apparatus can be used for many different types of machines. The self-calibration equipment includes a lamp which can be moved past the photocells to energize them one at a time. By energizing each photocell with the same light input, it is possible to bias each of the meters so that equal meter readings are obtained. A mask which can be placed in front of the photocells can be used to facilitate biasing of the meters during a calibration sequence so that a meter balance will be indicated when the desired light intensity pattern at any exposure window is not uniform. This is advantageous in those cases where a non-uniform pattern is necessary to compensate for imbalance in the corona charging system. Different masks for different types of machines in effect serve as permanent memories for storing calibration information.

It is a feature of my invention to provide apparatus attachable inside a copying machine for enabling an exposure lamp assembly to be aligned after it is placed in the machine on a production line.

It is another feature of my invention to provide a photocell-controlled feedback circuit to vary the light output of the bulbs in the lamp assembly so that in the balanced condition each photocell in the apparatus receives the same amount of light for all shutter openings.

It is another feature of my invention to provide a self-calibration unit for the apparatus.

It is still another feature of my invention to provide one or more masks for use with the self-calibration unit so that the alignment equipment can be calibrated simply to compensate for imbalances in the corona charging system or other parts of different types of copying machines.

Further objects, features and advantages of my invention will become apparent upon consideration of the following detailed description in conjunction with the drawing, in which.

Figure 1:
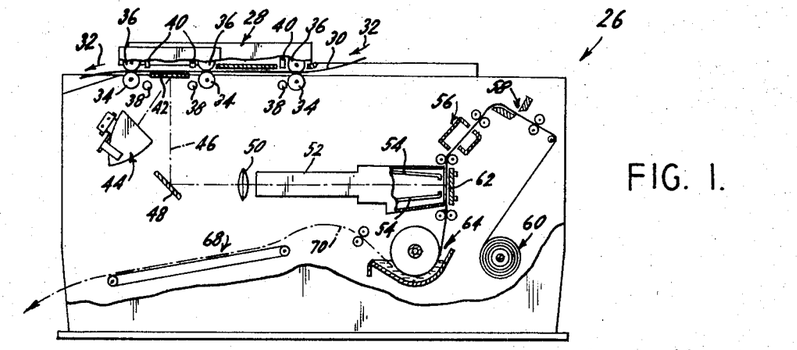
FIG. 1 depicts schematically a copying machine of the type with which the alignment equipment of my invention can be used.

FIG. 1 shows a typical copying machine 26, with only those parts being shown which are necessary for an understanding of the present invention. At the top of the machine are three drive rollers 34, a glass scanning window 42, and three energizing lamps 38. On top of the machine there is placed a bridge 28 which includes three pressure rollers 36 and three photocells 40. A drive chain (not shown) in the machine drives rollers 34 so that an original document 30 which is to be copied can be transported between the three pairs of drive and pressure rollers. The direction of movement of the original document is shown by arrows 32. Each lamp 38 directs light to a respective photocell 40. As the original document passes underneath a photocell, light from the respective lamp is blocked. The photocell sensors control the cycling of the machine and the direction in which the drive chain is moved. The direction of the drive is switched when multiple copies of an original document are to be made; the original document is transported back and forth past scanning window 42.

Lamp assembly 44 directs light toward scanning window 42. The light is reflected from the white areas on the original document and follows the path shown by dotted line 46. The light is reflected from mirror 48 and is then directed through lens 50 and light box 52 to an exposure station. Copy paper from a specially treated roll is fed past knife station 58 and corona station 56 to the exposure window, the copy paper passing between backing plate 62 and the tips of shutter blades 54. The knife arrangement serves to cut sheets of copy paper from the roll whose lengths are equal to those of the original documents to be copied. The corona section of the machine charges the treated face of the copy paper before it enters the exposure station. At the exposure station, the treated surface of the paper is discharged in those areas corresponding to white areas of the original. The copy sheet is then transported through a developer station 64 at which black toner particles are caused to adhere to the charged areas of the copy paper. The copy sheet then moves along the path indicated by dotted arrow 70 and is moved out of the machine by a conveyor section 68. A machine of the type described is more fully disclosed in Van Auken et al. application Ser. No. 725,390 entitled "Copying Machine" and filed on Apr. 30, 1968, now U.S. Pat. No. 3,575,503.

The amount of light reflected from any white area of the original to expose a respective area of the copy paper depends on the shutter opening. The farther apart shutter blades 54, the greater the exposure of the copy paper. A machine of the type shown in FIG. 1 is generally provided with an exposure control. The narrower the shutter opening, the less the discharge of the copy sheet and the darker the copy.

While it is desirable to be able to vary the amount of light which exposes the copy sheet in accordance with the shutter opening, it is necessary (except in a special case to be described below) that every point on the copy sheet be capable of being exposed to the same extent. This means that as each point on the copy sheet moves downward past the exposure window, the same total amount of light (from a corresponding white point on the original document) should impinge upon it as impinges upon all other points. Otherwise, the exposure will not be uniform and different vertical sections of each copy sheet will be exposed to different extents. It is for this reason that in the assembly of each copying machine, adjustments are made to insure equal total light intensities in all vertical sections taken through the exposure window.

Figure 2:
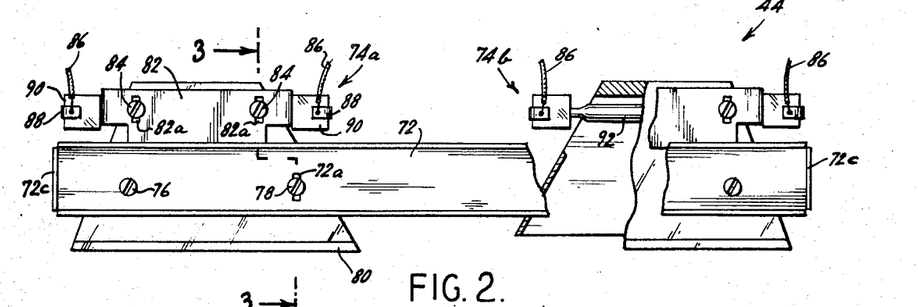
FIG. 2 is a top view, shown partially broken away, of a prior art lamp assembly 44 used in the machine of FIG. 1.

An appreciation of the need for equal light intensities for all shutter openings can be appreciated upon a consideration of FIGS. 2-13. FIG. 2, to be considered in detail below, shows a typical prior art exposure lamp assembly 44. The assembly includes two sub-assemblies 74a and 74b. Each sub-assembly is provided with a reflector 80 in which a bulb 92 is contained. The bulb-reflector arrangements can be seen most clearly in FIGS. 8, 10 and 12. These figures show different orientations for the bulbs within the two reflectors.

Typically, each of the reflectors has the shape of an ellipsoid, and the ideal case is that in which each bulb is contained along one of the axes of the ellipsoid. Bracket 72 is placed in the machine such that the other axis of each ellipsoid is slightly below the upper surface of scanning window 42. The original document to be copied moves face down above the scanning window and since the light from each reflector is concentrated at the second axis of the ellipsoid, it is preferable to displace this axis slightly away from the original document. Otherwise, in the event the original document remains stationary above the scanning window (e.g., in the case of a jam), the concentrated light could cause the document to burn.

Figure 4:
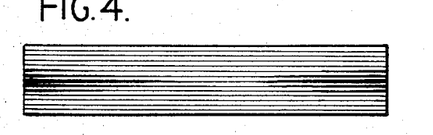
FIGS. 4-7 depict different exposure window illumination patterns.

FIG. 4 shows an exposure "window" which is improperly illuminated (by reflection from an all-white original document). In FIG. 4, it is assumed that shutters 54 are opened to the maximum extent so that maximum exposure of the copy paper is achieved. With reference to FIG. 4, it is to be understood that the copy paper moves downward past the exposure window. It will be noted that at both sides of the window the illumination is more intense (in FIGS. 4–7, the lines represent illumination). The more intense regions at either side of the window are the conventional "hot lines" produced by the two bulbs. Since only two bulbs are used, they have a tendency to provide more intense illumination at both sides of the exposure window along its center line. The light in the middle of the window should be more diffused, and the total light energy along any vertical line through the exposure window should be the same. As long as the total light which impinges upon each point of the copy paper is the same as that for every other point, uniform exposure is achieved. Thus it is not necessary that there be uniform illumination of the exposure window, but rather uniform total light energy along any vertical section taken through the exposure window. In FIG. 4, there is insufficient illumination in the central region of the window.

Figure 5:
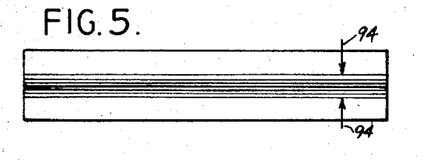

FIG. 5 shows the same exposure window but with the shutters in the "minimum exposure" position, shown by arrows 94, and with a uniform illumination pattern. Since the effective length of the exposure window is shorter, there is less exposure of each point on the copy sheet. Nevertheless, as long as the total amount of light which impinges upon any point as it moves past the exposure window does not vary, there will be uniform exposure of the copy sheet.

Figure 6:
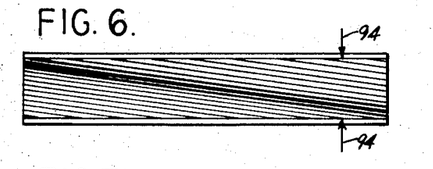

FIG. 6 shows another case in which the shutter blades are open to almost the full extent. Here, there is a hot line which extends from the upper left corner to the lower right corner. While there is clearly non-uniform illumination of the exposure window, this does not mean that the copy sheet is not uniformly exposed. As long as the total light energy along any vertical section through the exposure window does not vary, the copy sheet will be uniformly exposed. The fact that a point on the copy paper which passes the rightmost side of the exposure window does not receive its maximum exposure until it is ready to leave the window, while a point on the copy sheet which passes the left side of the window receives its maximum exposure as soon as it enters the window, does not affect the total exposure of each point.

Figure 7:
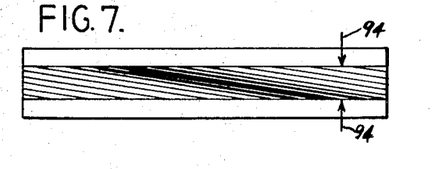

The problem with non-uniform illumination of the type shown in FIG. 6 is that non-uniform exposure can result with a smaller shutter opening as shown in FIG. 7. With the same illumination pattern, but with a smaller shutter opening, it is apparent that the "hot line" extends diagonally across only the middle region of the exposure window. Points on the copy sheet which pass near the sides of the window do not receive intense exposure since the "hot line" at the sides of the exposure window are blocked by the shutter blades. Thus with a small shutter opening and an illumination pattern as shown in FIG. 7, the middle region of each copy sheet will be more exposed than the side regions.

Figure 8:
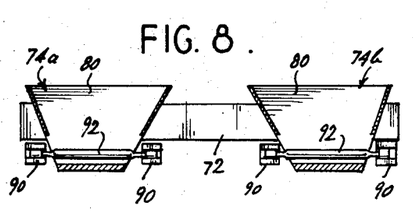
FIGS. 8 and 9, 10 and 11, and 12 and 13 depict different bulb positions within a lamp assembly and the respective resulting exposure window light intensity patterns.
Figure 9:
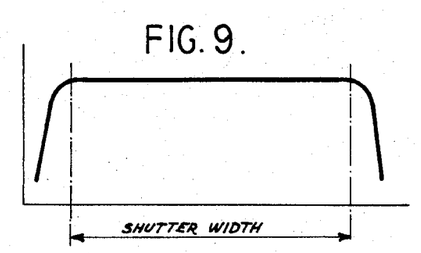
Figure 10:
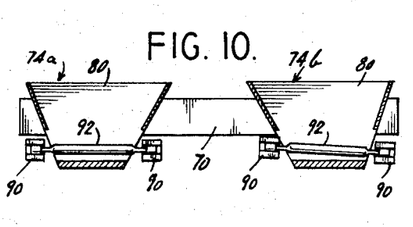
Figure 11:
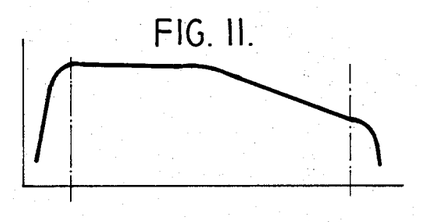
Figure 12:
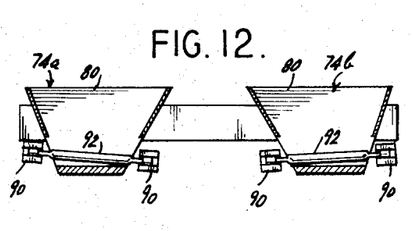
Figure 13:
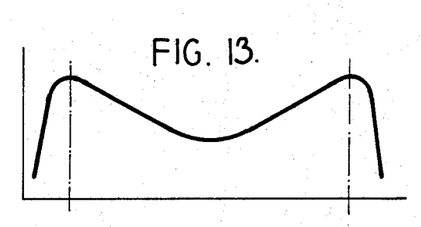

FIGS. 8–13 show three different lamp position combinations and the three resulting light energy patterns. Each of the patterns of FIGS. 9, 11 and 13 is a plot of total light exposure versus position along the shutter. In other words, the ordinate in each of the plots represents not the light intensity at any point in the exposure window, but rather the total light energy (or average intensity) along a vertical section through the window. When the two lamps are in the positions (in the reflectors) shown in FIG. 8, the total energy along each vertical section through the shutter is constant. (The total energy outside the shutter dimensions falls down, as shown, but this is of no moment since no paper passes these regions.) FIG. 9 depicts the desired condition.

In the case of FIG. 10, the lamp within reflector 74b is skewed slightly. More of the light reflected by reflector 74b is directed to the left end of the exposure window than in the ideal situation. This results in the average intensity pattern of FIG. 11 — the left half of each copy sheet will be more fully exposed than the right half.

In the example of FIG. 12, both lamps are skewed inwardly, and this results in the average intensity pattern of FIG. 13. In such a case, the middle region of each copy sheet is underexposed relative to the left and right regions. The illumination pattern corresponding to the case of FIGS. 12 and 13 is shown in FIG. 4.

It is on the assembly line that adjustments are made in the exposure lamp assembly 44 to achieve an average intensity pattern of the type shown in FIG. 9. As will be described below, the exposure lamp assembly can be adjusted in four different ways — each of the reflectors can be moved, and the bulb inside each reflector can be moved. In the prior art, each exposure lamp assembly was aligned in a fixture which allowed light to be directed to a simulated exposure window. At this window were a plurality of photocells and adjustments were made to each exposure lamp assembly until the total light impinging upon each photocell was the same. The aligned exposure lamp assembly was then placed in a copying machine. The problems with this approach are that even with a perfectly aligned exposure lamp assembly, when it is placed in a machine the intensity pattern may not be uniform. For example, typically, the brackets which mount each exposure lamp assembly in the machine have lugs with mounting holes for attachment of the assembly. If the lugs in a particular machine are bent slightly, the prealigned exposure lamp assembly will not provide uniform exposure. It is for this reason that, in accordance with the principles of my invention, an exposure lamp assembly is assembled in each machine prior to its alignment. A test fixture is then attached to the machine itself for facilitating alignment of the exposure lamp assembly after it has already been secured inside the machine in its final position.

Figure 3:
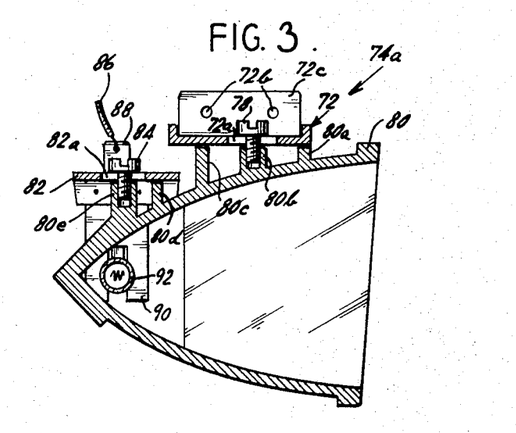
FIG. 3 is a sectional view taken through line 3—3 of FIG. 2.

Before proceding to a description of the alignment equipment, it will be helpful to review the various adjustments which can be made to the exposure lamp assembly shown in FIGS. 2 and 3. FIG. 2 is a top view of the assembly and shows a mounting bracket 72. This bracket is secured in the copying machine in a conventional manner by inserting screws through holes 72b in lugs 72c so that light from the two reflectors 80 is directed as shown in FIG. 1. Reflector sub-assemblies 74a and 74b are identical (except that they are the mirror images of each other) and consequently only sub-assembly 74a will be described.

The top of reflector 80 is provided with three ridges 80a, 80b, 80c as shown in FIG. 3. The middle ridge (80b) includes a first screw hole for containing screw 78. The screw is inserted through slot 72a in bracket 72. Ridge 80b also includes a second screw hole (not shown) into which screw 76 is inserted. Screw 76 is extended through a hole in bracket 72 rather than a slot. If screw 78 is loosened, it is apparent that the entire reflector 80 can be rotated around the pivot defined by screw 76, the extent of the rotation being limited by the length of slot 72a. When the screw is tightened, the reflector is held rigidly in place by ridges 80a, 80b, 80c which bear against the underside of bracket 72.

At the rear of reflector 80 are another two ridges 80d, 80e. Ridge 80e includes two screw holes for containing a pair of screws 84. A bracket 82 is provided with two slots 82a, and the two screws are extended through these slots into the screw holes in ridge 80e.

At each side of bracket 82 is a vertically depending insulating member 90, as seen most clearly in FIG. 3. Extending along the outer face of each insulating member is a contact 88 which is connected to a conductor 86. At the lower end of each of members 90 there is a socket for holding one end of a bulb 92 in engagement with one of contacts 88. Typically, the bulb has a tungsten filament in a quartz envelope, with bromine gas being contained within the envelope. When an energizing potential is applied across the two conductors 86, current flows from one conductor, through one of contacts 88, the bulb, and the other contact to the other conductor 86. The reflector is provided with two holes at either side thereof (as seen most clearly in sub-assembly 74b in FIG. 2) to allow the bulb to extend through the reflector and to be moved within it.

If the two screws 84 are loosened, it is apparent that bracket 82 can be moved to change the orientation of bulb 92 within the reflector. Once the desired position is determined, the two screws may be tightened to lock the bulb in place. It is thus apparent that two different adjustments may be made in connection with each of sub-assemblies 74a and 74b. First, each reflector 80 can be moved and second the bulb within each reflector can be moved. FIGS. 8, 10 and 12 show various positions for the bulbs within the reflectors, although the positions of the two reflectors are the same in all three figures. However, it is readily apparent that the positions of the reflectors can be adjusted as described. Depending on the positions of the reflectors and the bulbs, different illumination patterns at the exposure window are exhibited.

Figure 14:
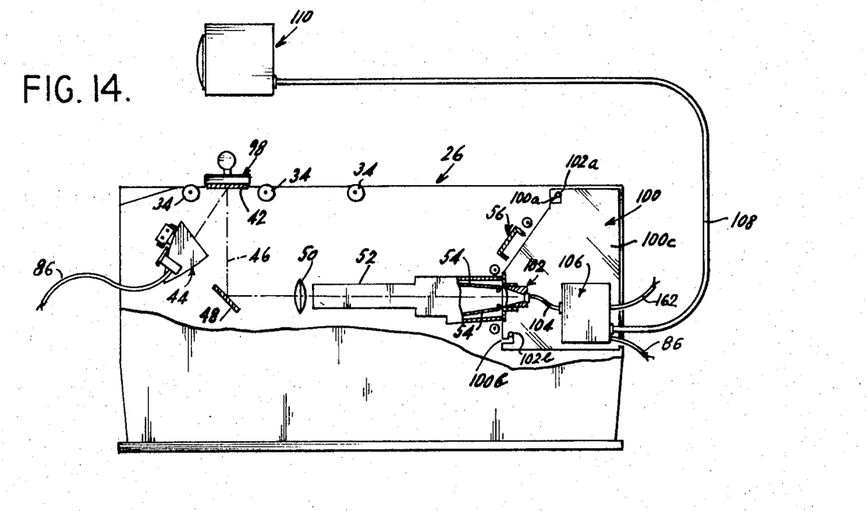
FIG. 14 depicts schematically the alignment equipment of my invention with a test fixture in place in the copying machine of FIG. 1 before it is fully assembled.

FIG. 14 shows the test fixture 100 attached to a machine on the production line after lamp assembly 44 is mounted in it. The test fixture has two sides 100c each of which has two grooves 100a, 100b. On each side of the machine there are two pins 102a, 102b on which the sides of the test fixture are temporarily mounted. The lamp alignment takes place before the complete corona section 56, knife assembly 48 and paper roll compartment in the machine of FIG. 1 are assembled. In this way, the test fixture can be placed inside the machine. The test fixture includes a photocell and lens assembly 102, the face of which is positioned at the exposure window, and a control circuit 106.

The control circuit is connected over cable 104 to the photocells included in assembly 102. Input power to circuit 106 is derived from line 162. Circuit 106 is also connected by a cable 86 to lamp assembly 44. When the lamp assembly is placed in the machine, it is not permanently wired to those conductors which ordinarily supply it with power. Instead, temporary connections are made to cable 86 so that the two lamps can be powered from circuit 106. Circuit 106 is also connected to meter box 110 over cable 108.

During the alignment procedure, scanning window 42 is covered by any object 98 which exhibits a white undersurface so that a white original document is simulated. When using the apparatus, the operator sits in a position to the left of the machine in FIG. 14. In this manner, she can observe the various meters in meter box 110 while at the same time adjusting the reflectors and bulbs within the lamp assembly 44. Continuous adjustments are made until all of the meter readings are within specified ranges, as will be described below.

Assembly 102 includes nine photocells 114a–114i spaced at approximately equal intervals. Each photocell functions to measure the total light energy (or average intensity) along a vertical rectangular section of the exposure window. A satisfactory illumination pattern is achieved when all of the photocells intercept the same amount of light.

Figure 15:
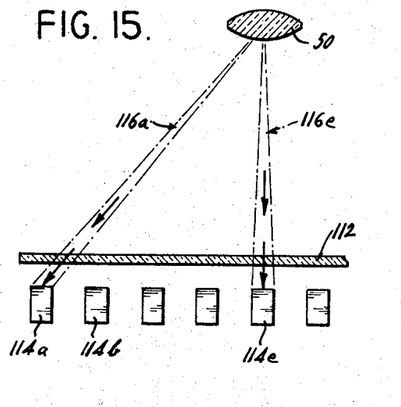
FIG. 15 depicts a certain light-gathering characteristic of the photocells in the test fixture without the inclusion of the Fresnel lens in the fixture.

However, several difficulties are encountered when using a photocell in this manner to measure the total amount of light which impinges upon any vertical section through the exposure window. Reference should first be made to FIG. 15 which illustrates several photocells, assumed to be to the rear of the exposure window when test fixture 100 is placed in the machine, together with lens 50 (see FIGS. 1 and 14). FIG. 15 illustrates the light which impinges upon each photocell as seen from above the machine. Assuming that the light is transmitted through a diffusing plate 112, it is apparent that even if photocells 114a and 114e gather the same total light, because the light in each case is incident at a different angle the photocell responses (which are sensitive to angle of incidence) will be different. For this reason, the simple arrangement of FIG. 15 is not the best possible.

Figure 16:
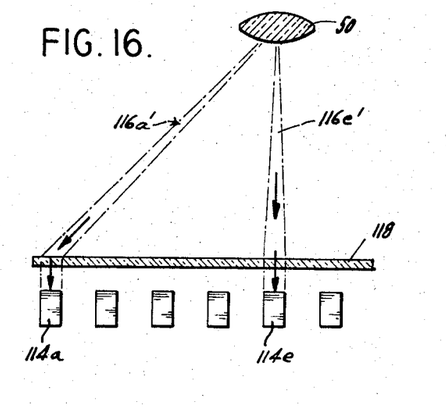
FIG. 16 depicts the same light-gathering characteristic of the photocells when a Fresnel lens is included in the test fixture.

Instead, the arrangement of FIG. 16 shows the use of a Fresnel lens 118 instead of a diffuser 112. The function of the Fresnel lens is to direct the rays of light in cones 116a' and 116e' (and the similar rays of light in the other cones, not shown) to the photocells such that the light incident on each photocell is normal to its face. In other words, with the use of the Fresnel lens, a proper illumination pattern provides effective inputs to all of the photocells which are equal.

Figure 17:
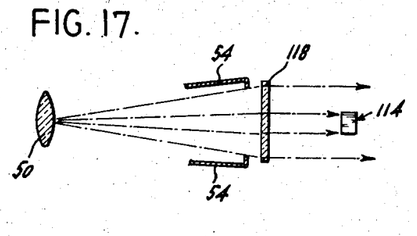
FIG. 17 depicts another light-gathering characteristic of each photocell without the inclusion of an additional cylinder lens in the test fixture.
Figure 18:
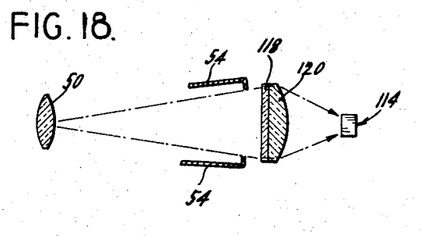
FIG. 18 depicts this other light-gathering characteristic with the inclusion of an additional cylinder lens for each photo in the test fixture.

The light-gathering characteristics of the photocells have been considered in FIGS. 15 and 16 from a vantage point above the machine. FIGS. 17 and 18 illustrate the light-gathering ability of the photocells as seen from a side of the machine. Referring to FIG. 17, the Fresnel lens 118 serves to produce parallel light rays even though the rays all emanate from lens 50. As the opening of shutter blades 54 is varied, it is apparent that the total light energy across each vertical section of the exposure window varies as well. But photocell 114 in FIG. 17 is not capable of gathering all of the light transmitted through the shutter blades in the first place since it only intercepts the light rays included in a small central cone.

For this reason, in front of each photocell 114 there is placed an additional lens 120. Each lens 120 serves to gather all of the light transmitted through the respective vertical rectangular section of the exposure window and Fresnel lens 118 and to direct all of it to the respective photocell. Thus each photocell output is a function of all of the light transmitted through the shutter blades in a respective vertical section of the exposure window.

Figure 19:
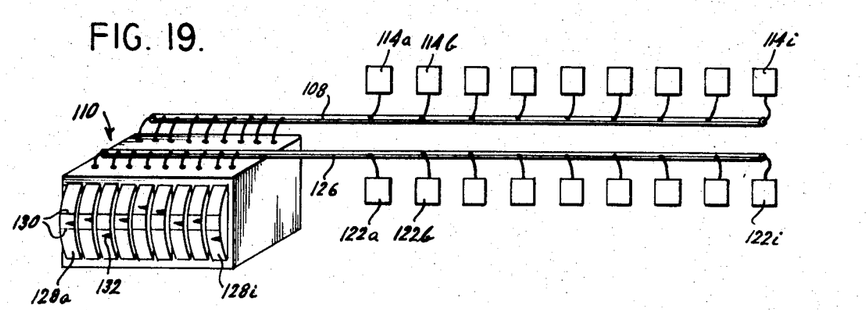
FIG. 19 depicts meter box 110 together with its photocell and bias control inputs.

The output of each photocell 114 is extended over a respective pair of conductors in cable 104 (see FIG. 14) to control circuit 106. From circuit 106, the output of each photocell is extended to a respective one of meters 128a–128i in meter box 110. (Amplification of the signals may be provided in circuit 106, if desired, as is known in the art.) In FIG. 19, the outputs of photocells 114a–114i are shown as being extended over cable 108 to respective meters. Each meter is of the rotary type in which the degree of rotation of the face is a function of the input signal. On the housing of each meter are a pair of tolerance marks 130, and the face of each rotary meter is provided with a marker or indicator 132. In the case of photocells having identical response characteristics (and neglecting, for the moment, bias controls 122a–122i), and assuming that each photocell detects the same amount of light, all of the markers 132 will be at the same level. This is an indication that a satisfactory illumination pattern has been achieved. The operator manipulates the adjustment screws on the lamp assembly until all of the markers 132 are approximately at the same level.

However, it has been found that the arrangement as described thus far is not the most satisfactory. This is due to the fact that as the shutter opening is varied each photocell detects a varying amount of light. This means that as the shutter opening is increased, all of the meter readings increase. It is far easier for an operator to determine proper lamp alignment when all of the markers 132 fall within the tolerance marks 130 than it is without the aid of such tolerance marks. If all of the markers 132 move in the same direction — outside the range of the tolerance marks 130 — it is far more difficult to determine that the two meters whose readings are the farthest apart do not differ by an amount greater than the spacing between tolerance marks 130. Furthermore, all of the photocells have different response curves, that is, their outputs do not change to the same extent as their light inputs change. For this reason, even if the meter readings are identical with one shutter opening, it is possible for the meter readings to be different with another shutter opening even in the case of a perfectly uniform illumination pattern.

Figure 20:
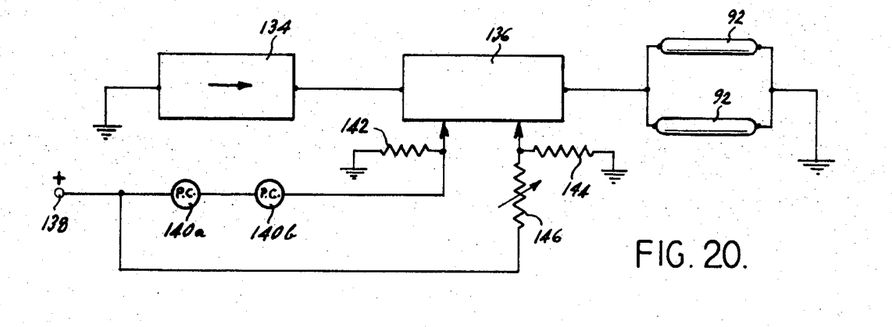
FIG. 20 is a schematic circuit of control circuit 106 in test fixture 100 of FIG. 14.

Control circuit 106 is shown in greater detail in FIG. 20; the circuit functions to insure that the intensity of the light generated by bulbs 92 varies with the shutter opening. The greater the shutter opening, the greater the amount of light which would ordinarily impinge upon each photocell. To counteract this effect, the currents through the bulbs are reduced so that the total amount of light impinging upon each photocell is reduced. Thus when alignment is achieved each photocell detects a predetermined amount of light. Furthermore, the meter markers 132 are all made to fall within tolerance marks 130 so that alignment can be verified very easily.

Two additional photocells 140a, 140b are provided at either side of the exposure window — to the left of photocell 114 and to the right of photocell 114i. The two additional photocells are connected in series between source 138 and one input of control unit 136. Source 138 is connected through potentiometer 146 directly to the other input of control unit 136. The two inputs to unit 136 are connected through equal-magnitude resistors 142, 144 to ground. It is apparent that only if the combined impedances of photocells 140a and 140b equals that of potentiometer 146 will the potentials at the two inputs of unit 136 be equal. Control unit 136 functions to extend the current from current source 134 over cable 96 to bulbs 92. However, the magnitude of the current is increased or decreased in accordance with the relative polarity of the voltages appearing across resistors 142 and 144. If the light detected by photocells 140a and 140b increases so that their combined impedances varies from that of potentiometer 146, control unit 136 reduces the current extended to lamps 92 until the lesser amount of light detected by photocells 140a and 140b produces combined impedances which equal that of potentiometer 146. Similarly, if the shutter opening is made smaller so that less light is detected by photocells 140a and 140b, an increased current is directed to bulbs 92 so that more light is generated by the bulbs. The overall effect of the circuit is to insure that no matter what the shutter opening, photocells 140a and 140b always detect the same amount of light. This, in turn, implies that the total amount of light detected by each of photocells 114a–114i does not vary with the shutter opening.

Each of meters 128a–128i is provided with a respective bias control 122a–122i (FIG. 19). The bias controls serve to offset each meter as is known in the art. Initially, the bias controls are all adjusted such that in the case of a satisfactory illumination pattern, all of the markers 132 fall within tolerance marks 130. It is apparent that the test fixture can then be used in any other machine with markers 132 always falling within tolerance marks 130 when a satisfactory illumination pattern is achieved. This is true no matter what the shutter opening. The operator adjusts the lamp assembly until all of the meter readings fall within the proper range — for all shutter openings.

As will be described below different bias settings may be necessary when the apparatus is used on different types of machines. Also, periodically, it is necessary to replace the photocells. Since no two photocells are guaranteed to have the same characteristics, it is apparent that the bias control settings for one group of photocells may not be correct for another group. For these reasons, I provide a mechanism whereby the proper bias settings for any group of photocells can be easily ascertained when used in conjunction with any type of machine.

Figure 21:
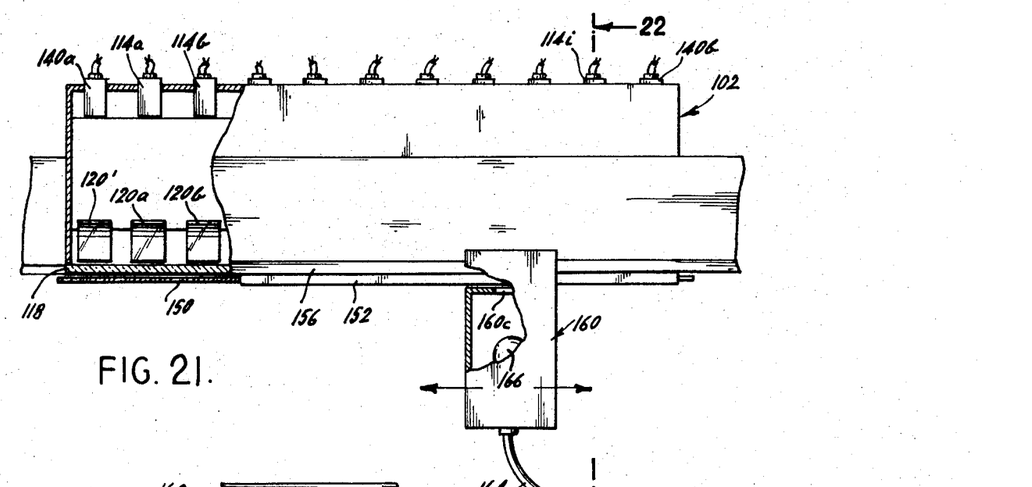
FIG. 21 is a top view of lens-photocell assembly 102 in test fixture 100, with a calibration unit 160 shown in place.
Figure 22:
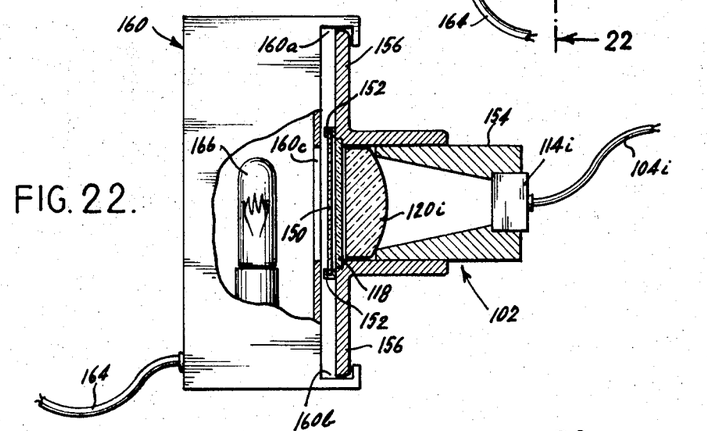
FIG. 22 is a sectional view taken through line 22—22 of FIG. 21.

FIGS. 21 and 22 depict in detail the lens-photocell assembly 102. It will be recalled that the assembly includes a Fresnel lens 118 adjacent to which are mounted lenses 120a–120i for directing light to respective photocells 114a–114i. A shown in FIG. 21, an additional lens 120' is provided for photocell 140a, and another lens (not shown) is provided for photocell 140b. The Fresnel lens and the 11 lenses individually associated with the eleven photocells are mounted by a pair of brackets 156 and a mounting member 154. Any conventional techniques can be used for this purpose and that shown in FIGS. 21 and 22 is only illustrative.

A light box 160 is provided with two guides 160a, 160b. These guides fit over the ends of brackets 156, and as shown in FIG. 21 the light box can be moved horizontally across the front of assembly 102. (Of course, this can only be done when test fixture 100 is not in a machine, the case when it is being calibrated.) The light box includes a lamp 166 and an opening 160c. A highly regulated source of power is extended over conductor pair 164 to energize the lamp. As the light box is moved across the face of the Fresnel lens, it is apparent that when it is positioned in front of each of lenses 120 the same amount of light will be directed through each lens to the respective photocell. This is due to the fact that the identical light source is being used in each case. Thus when any new group of photocells is substituted for an old group, or even when a single photocell is replaced, all that is required to calibrate the equipment is to move light box 160 from lens to lens and to adjust each bias control so that the indicator mark of each of the meters falls within the respective tolerance marks. In fact, it has been found helpful to calibrate the test equipment periodically, perhaps every week or two, even when photocells are not replaced. This insures the accuracy of all alignments even though the photocell characteristics change with age.

There is one situation in which equal photocell inputs are not desired, that is, a non-uniform light intensity pattern (across different vertical sections of the exposure window) is necessary. It is some times found that for one reason or another the various regions of a copy sheet do not have a uniform appearance even when the exposure is uniform. This situation can arise, for example, due to non-uniformities in the corona station of all machines in a particular production run; if a particular section of the corona causes a decreased charge to be applied to one section of the copy paper, it is apparent that this section will be lighter on each copy made by a machine. For uniform appearance, it is necessary that this vertical section of each copy sheet be illuminated to a lesser extent than the other sections. This can be accomplished by having the operator adjust the lamp assembly to provide a non-uniform light intensity pattern, but of course this is difficult if different meter readings are required. For this reason, the bias controls are adjusted such that the desired non-uniform light intensity pattern results in equal meter readings. As far as the operator is concerned, she is unaware of the different bias settings and merely adjusts each lamp assembly until the meter readings are all the same (all of the indicator marks are within the tolerance marks).

However, in such a case it would appear that the calibration technique involving the use of light box 160 would be of no avail since the use of the light box allows the individual bias controls to be set such that the meters all read the same when the same amount of light is directed to each photocell. However, I provide a mask of the form illustrated in FIG. 23 which allows light box 160 to be used for calibration purposes even when uniform appearance is achieved for each machine when different light energies are directed to different vertical sections through the exposure window. Mask 150 contains eleven sections, the leftmost and rightmost ones of which (150', 150'') are clear. The other nine sections 150a–150i are transparent but to different degrees. (Actually, a satisfactory mask can be made of paper, with individual sections darkened by using a pencil, inasmuch as ordinary paper transmits a sufficient amount of light for calibration purposes.) The mask is placed in two brackets 152 as shown in FIGS. 21 and 22 so that the mask is situated in front of Fresnel lens 118. The individual sections of the mask are shaded such that even when the same light source is used to calibrate each photocell, different amounts of light are directed to each photocell. The relative shadings of the various sections of the mask are determined in accordance with the characteristics of each production run.

Figure 23:
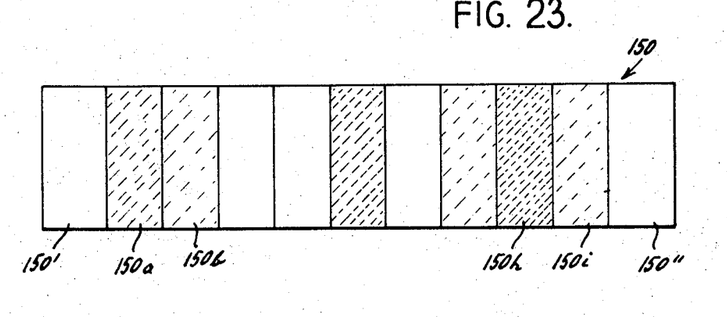
FIG. 23 depicts a typical mask 150 which can be placed in lens-photocell assembly 102 during a calibration procedure.

For example, consider the situation in which the corona under-charges the copy paper in a region corresponding to section 150h of mask 150. To compensate for the under-charging, it is necessary to under-expose this section. By shading section 150h of the mask, it is apparent that in the calibration process meter 128h will not provide as high a reading as the other meters when light box 160 is used to illuminate each photocell since less light is directed to photocell 114h than to the others. To increase the reading of meter 128h, bias control 122h must be set such that a reduced light input causes a greater than normal meter reading. Thereafter, when the mask is removed during actual use of the test fixture, it is apparent that meter 128h will be at the level of the other meters when photocell 114h detects a lesser amount of light. Thus when the operator determines that the lamp assembly is aligned, in fact less light is being transmitted through the exposure window in that portion corresponding to section 158h of the mask than is being directed to other sections. This reduced light intensity compensates for the under-charged section of the copy sheet. Although a different mask must be made for each type of machine with which the test apparatus is used, once a mask is made it is a simple matter to calibrate the test equipment periodically or whenever one or more photocells are replaced while the apparatus is being used with the particular type of machine.

Since different types of machines generally require different non-uniform illumination patterns, it is the masks which allow the same test apparatus to be calibrated quickly for use on different assembly lines.

Althouth the invention has been described with reference to a particular embodiment, it is to be understood that this embodiment is merely illustrative of the application of the principles of the invention. Numerous modifications may be made therein and other arrangements may be devised without departing from the spirit and scope of the invention.

What I claim is:

1. Apparatus for aligning the exposure lamp assembly included in a copying machine after said exposure lamp assembly is fixed in said copying machine but prior to the completion of the assembly of said copying machine, said copying machine having an exposure window, comprising means for simulating a white original document for controlling the reflection of light from said exposure lamp assembly to said exposure window, a fixture containing a plurality of photocells, means for mounting said fixture in said copying machine in a position such that said photocells are disposed adjacent to respective regions of said exposure window, a plurality of indicating means coupled to said photocells for indicating when the total light impinging upon each of said photocells is within the same predetermined range, and means for adjusting said exposure lamp assembly to vary the illumination pattern at said exposure window.

2. Apparatus in accordance with claim 1 further including Fresnel lens means disposed between said exposure window and the faces of said photocells.

3. Apparatus in accordance with claim 2 wherein said exposure window has a long dimension along which said photocells are linearly disposed and a short dimension, and variable shutter means for controlling the dimension of the area illuminated by said exposure lamp assembly at said exposure window in said short dimension, the maximum extent of said illumination in said short dimension being greater than the dimension of the face of each of said photocells in said short dimension, and lens means for controlling the impinging of all of the light passing through said exposure window within a predetermined section of said exposure window in the long dimension upon each photocell independent of the opening of said shutter means.

4. Apparatus in accordance with claim 3 further including additional photocell means disposed adjacent to said exposure window for deriving a signal indicative of the magnitude of all of the light directed through said exposure window, and feedback means for controlling the intensity of the light emitter by said exposure lamp assembly in accordance with said signal such that when all of said indicating means indicate that said exposure lamp assembly is aligned all of said indicating means provide indications falling within said predetermined range within predetermined minimum and maximum bounds.

5. Apparatus in accordance with claim 4 wherein each of said indicating means includes biasing means for enabling an offset to be introduced in the indication of each of the indicating means.

6. Apparatus in accordance with claim 5 wherein said copying machine is elongated and when fully assembled includes said exposure lamp assembly disposed at one end thereof and a paper compartment disposed at the other end thereof, said fixture being mounted in said copying machine in said paper compartment prior to the assembly thereof during the production of said machine, and said plurality of indicating means are disposed above said machine at that end containing said exposure lamp assembly such that an operator adjusting said exposure lamp assembly can view said plurality of indicating means directly thereabove.

7. Apparatus in accordance with claim 6 further including calibration means attachable to said fixture when it is withdrawn from said copying machine, said calibration means including means for controlling the impinging of a predetermined amount of light on a single one of said photocells at any time and being movable such that said predetermined amount of light impinges upon successive ones of said photocells, the adjustment of said biasing means to provide equal indications by said indicating means as said calibration means is moved past all of said photocells insuring that said indicating means will indicate a satisfactory illumination pattern at said exposure window when said apparatus is used to align an exposure lamp assembly and all of said indications fall within said predetermined range.

8. Apparatus in accordance with claim 7 further including at least one mask means having differently shaded regions positionable between said calibration means and said photocells, a respective shaded region being provided for each of said photocells for enabling calibration of said apparatus for a respective type of copying machine so that said apparatus can thereafter be used to indicate a balanced light intensity pattern at said exposure window when in fact no such balance exists to compensate for an imbalance in another part of the copying machine whose exposure lamp assembly is being aligned.

9. Apparatus in accordance with claim 3 further including calibration means attachable to said fixture when it is withdrawn from said copying machine, said calibration means including means for controlling the impinging of a predetermined amount of light on a single one of said photocells at any time and being movable such that said predetermined amount of light impinges upon successive ones of said photocells, the adjustment of said biasing means to provide equal indications by said indicating means as said calibration means is moved past all of said photocells insuring that said indicating means will indicate a satisfactory illumination pattern at said exposure window when said apparatus is used to align an exposure lamp assembly and all of said indications fall within said predetermined range.

10. Apparatus in accordance with claim 9 further including at least one mask means having differently shaded regions positionable between said calibration means and said photocells, a respective shaded region being provided for each of said photocells for enabling calibration of said apparatus for a respective type of copying machine so that said apparatus can thereafter be used to indicate a balanced light intensity pattern at said exposure window when in fact no such balance exists to compensate for an imbalance in another part of the copying machine whose exposure lamp assembly is being aligned.

11. Apparatus in accordance with claim 2 further including calibration means attachable to said fixture when it is withdrawn from said copying machine, said calibration means including means for controlling the impinging of a predetermined amount of light on a single one of said photocells at any time and being movable such that said predetermined amount of light impinges upon successive ones of said photocells, the adjustment of said biasing means to provide equal indications by said indicating means as said calibration means is moved past all of said photocells insuring that said indicating means will indicate a satisfactory illumination pattern at said exposure window when said apparatus is used to align an exposure lamp assembly and all of said indications fall within said predetermined range.

12. Apparatus in accordance with claim 11 further including at least one mask means having differently shaded regions positionable between said calibration means and said photocells, a respective shaded region being provided for each of said photocells for enabling calibration of said apparatus for a respective type of copying machine so that said apparatus can thereafter be used to indicate a balanced light intensity pattern at said exposure window when in fact no such balance exists to compensate for an imbalance in another part of the copying machine whose exposure lamp assembly is being aligned.

13. Apparatus in accordance with claim 1 further including lens means disposed between said exposure window and the faces of said photocells for enabling each of said photocells to gather all of the light impinging upon an equal area of said exposure window.

14. Apparatus in accordance with claim 13 further including additional photocell means disposed adjacent to said exposure window for deriving a signal indicative of the magnitude of all of the light directed through said exposure window, and feedback means for controlling the intensity of the light emitted by said exposure lamp assembly in accordance with said signal such that when all of said indicating means indicate that said exposure lamp assembly is aligned all of said indicating means provide indications falling within said predetermined range within predetermined minimum and maximum bounds.

15. Apparatus in accordance with claim 14 wherein each of said indicating means includes biasing means for enabling an offset to be introduced in the indication of each of the indicating means.

16. Apparatus in accordance with claim 15 wherein said copying machine is elongated and when fully assembled includes said exposure lamp assembly disposed at one end thereof and a paper compartment disposed at the other end thereof, said fixture being mounted in said copying machine in said paper compartment prior to the assembly thereof during the production of said machine, and said plurality of indicating means are disposed above said machine at that end containing said exposure lamp assembly such that an operator adjusting said exposure lamp assembly can view said plurality of indicating means directly thereabove.

17. Apparatus in accordance with claim 16 further including calibration means attachable to said fixture when it is withdrawn from said copying machine, said calibration means including means for controlling the impinging of a predetermined amount of light on a single one of said photocells at any time and being movable such that said predetermined amount of light impinges upon successive ones of said photocells, the adjustment of said biasing means to provide equal indications by said indicating means as said calibration means is moved past all of said photocells insuring that said indicating means will indicate a satisfactory illumination pattern at said exposure window when said apparatus is used to align an exposure lamp assembly and all of said indications fall within said predetermined range.

18. Apparatus in accordance with claim 17 further including at least one mask means having differently shaded regions positionable between said calibration means and said photocells, a respective shaded region being provided for each of said photocells for enabling calibration of said apparatus for a respective type of copying machine so that said apparatus can thereafter be used to indicate a balanced light intensity pattern at said exposure window when in fact no such balance exists to compensate for an imbalance in another part of the copying machine whose exposure lamp assembly is being aligned.

19. Apparatus in accordance with claim 1 further including additional photocell means disposed adjacent to said exposure window for deriving a signal indicative of the magnitude of all of the light directed through said exposure window, and feedback means for controlling the intensity of the light emitted by said exposure lamp assembly in accordance with said signal such that when all of said indicating means indicate that said exposure lamp assembly is aligned all of said indicating means provide indications falling within said predetermined range within predetermined minimum and maximum bounds.

20. Apparatus in accordance with claim 19 wherein each of said indicating means includes biasing means for enabling an offset to be introduced in the indication of each of the indicating means.

21. Apparatus in accordance with claim 20 wherein said copying machine is elongated and when fully assembled includes said exposure lamp assembly disposed at one end thereof and a paper compartment disposed at the other end thereof, said fixture being mounted in said copying machine in said paper compartment prior to the assembly thereof during the production of said machine, and said plurality of indicating means are disposed above said machine at that end containing said exposure lamp assembly such that an operator adjusting said exposure lamp assembly can view view said plurality of indicating means directly thereabove.

22. Apparatus in accordance with claim 1 wherein each of said indicating means includes biasing means for enabling an offset to be introduced in the indication of each of the indicating means.

23. Apparatus in accordance with claim 22 wherein said copying machine is elongated and when fully assembled includes said exposure lamp assembly disposed at one end there—and a paper compartment disposed at the other end thereof, said fixture being mounted in said copying machine in said paper compartment prior to the assembly thereof during the production of said machine, and said plurality of indicating means are disposed above said machine at that end containing said exposure lamp assembly such that an operator adjusting said exposure lamp assembly can view said plurality of indicating means directly thereabove.

24. Apparatus in accordance with claim 1 wherein said copying machine is elongated and when fully assembled includes said exposure lamp assembly disposed at one end thereof and a paper compartment disposed at the other end thereof, said fixture being mounted in said copying machine in said paper compartment prior to the assembly thereof during the production of said machine, and said plurality of indicating means are disposed above said machine at that end containing said exposure lamp assembly such that an operator adjusting said exposure lamp assembly can view said plurality of indicating means directly thereabove.

25. Apparatus for aligning the exposure lamp assembly included in a copying machine after said exposure lamp assembly is fixed in said copying machine, said copying machine having an exposure window, comprising means for directing light from said exposure lamp assembly to said exposure window, a fixture containing a plurality of light-measuring means, means for mounting said fixture in said copying machine in a position such that said light-measuring means are disposed adjacent to respective regions of said exposure window, a plurality of indicating means coupled to said light-measuring means for indicating the total light energy impinging upon each of said light-measuring means, lens means disposed between said exposure window and the faces of said light-measuring means for enabling each of said light-measuring means to respond equally to all of the light impinging upon an equal area of said exposure window, and means for adjusting said exposure lamp assembly to vary the illumination pattern at said exposure window.

26. Apparatus in accordance with claim 25 wherein said exposure window has a long dimension along which said light-measuring means are linearly disposed and a short dimension, and variable shutter means for controlling the dimension of the area illuminated by said exposure lamp assembly at said exposure window in said short dimension, the maximum extent of said illumination in said short dimension being greater than the dimension of the face of each of said light-measuring means in said short dimension, and lens means for controlling the impinging of all of the light passing through said exposure window within a predetermined section of said exposure window in the long dimension upon each light-measuring means independent of the opening of said shutter means.

27. Apparatus in accordance with claim 26 further including additional light-measuring means disposed adjacent to said exposure window for deriving a signal indicative of the magnitude of all of the light directed through said exposure windows, and feedback means for controlling the intensity of the light emitted by said exposure lamp assembly in accordance with said signal such that when all of said indicating means indicate that said exposure lamp assembly is aligned all of said indicating means provide indications falling within predetermine minimum and maximum bounds.

28. Apparatus in accordance with claim 27 wherein each of said indicating means includes biasing means for enabling an offset to be introduced in the indication of each of the indicating means.

29. Apparatus in accordance with claim 28 wherein said copying machine is elongated and when fully assembled includes said exposure lamp assembly disposed at one end thereof and a paper compartment disposed at the other end thereof, said fixture being mounted in said copying machine in said paper compartment prior to the assembly thereof during the production of said machine, and said plurality of indicating means are disposed above said machine at that end containing said exposure lamp assembly such that an operator adjusting said exposure lamp assembly can view said plurality of indicating means directly thereabove.

30. Apparatus in accordance with claim 29 further including calibration means attachable to said fixture when it is withdrawn from said copying machine, said calibration means including means for controlling the impinging of a predetermined amount of light on a single one of said light-measuring means at any time and being movable such that said predetermined amount of light impinges upon successive ones of said light-measuring means, the adjustment of said biasing means to provide equal indications by said indicating means as said calibration means is moved past all of said light-measuring means insuring that said indicating means will indicate a satisfactory illumination pattern at said exposure window when said apparatus is used to align an exposure lamp assembly and all of said indications fall within said predetermined minimum and maximum bounds.

31. Apparatus in accordance with claim 30 further including mask means having differently shaded regions positionable between said calibration means and said light-measuring means, a respective shaded region being provided for each of said light-measuring means for enabling calibration of said apparatus so that said apparatus can thereafter be used to indicate a balanced light intensity pattern at said exposure window when in fact no such balance exists to compensate for an imbalance in another part of the copying machine whose exposure lamp assembly is being aligned.

32. Apparatus in accordance with claim 26 further including calibration means attachable to said fixture when it is withdrawn from said copying machine, said calibration means including means for controlling the impinging of a predetermined amount of light on a single one of said light-measuring means at any time and being movable such that said predetermined amount of light impinges upon successive ones of said light-measuring means, the adjustment of said biasing means to provide equal indications by said indicating means as said calibration means is moved past all of said light-measuring means insuring that said indicating means will indicate a satisfactory illumination pattern at said exposure window when said apparatus is used to align an exposure lamp assembly and all of said indications fall within said predetermined range.

33. Apparatus in accordance with claim 32 further including mask means having differently shaded regions positionable between said calibration means and said light-measuring means, a respective shaded region being provided for each of said light-measuring means for enabling calibration of said apparatus so that said apparatus can thereafter be used to indicate a balanced light intensity pattern at said exposure window when in fact no such balance exists to compensate for an imbalance in another part of the copying machine whose exposure lamp assembly is being aligned.

34. Apparatus in accordance with claim 25 further including calibration means attachable to said fixture when it is withdrawn from said copying machine, said calibration means including means for controlling the impinging of a predetermined amount of light on a single one of said light-measuring means at any time and being movable such that said predetermined amount of light impinges upon successive ones of said light-measuring means, the adjustment of said biasing means to provide equal indications by said indicating means as said calibration means is moved past all of said light-measuring means insuring that said indicating means will indicate a satisfactory illumination pattern at said exposure window when said apparatus is used to align an exposure lamp assembly and all of said indications fall within said predetermined range.

35. Apparatus in accordance with claim 34 further including mask means having differently shaded regions positionable between said calibration means and said light-measuring means, a respective shaded region being provided for each of said light-measuring means for enabling calibration of said apparatus so that said apparatus can thereafter be used to indicate a balanced light intensity pattern at said exposure window when in fact no such balance exists to compensate for an imbalance in another part of the copying machine whose exposure lamp assembly is being aligned.

36. Apparatus in accordance with claim 25 further including additional light-measuring means disposed adjacent to said exposure window for deriving a signal indicative of the magnitude of all of the light directed through said exposure window, and feedback means for controlling the intensity of the light emitted by said exposure lamp assembly in accordance with said signal such that when all of said indicating means indicate that said exposure lamp assembly is aligned all of said indicating means provide indications falling within predetermined minimum and maximum bounds.

37. Apparatus in accordance with claim 36 wherein each of said indicating means includes biasing means for enabling an offset to be introduced in the indication of each of the indicating means.

38. Apparatus in accordance with claim 37 wherein said copying machine is elongated and when fully assembled includes said exposure lamp assembly disposed at one end thereof and a paper compartment disposed at the other end thereof, said fixture being mounted in said copying machine in said paper compartment prior to the assembly thereof during the production of said machine, and said plurality of indicating means are disposed above said machine at that end containing said exposure lamp assembly such that an operator adjusting said exposure lamp assembly can view said plurality of indicating means directly thereabove.

39. Apparatus in accordance with claim 38 further including calibration means attachable to said fixture when it is withdrawn from said copying machine, said calibration means including means for controlling the impinging of a predetermined amount of light on a single one of said light-measuring means at any time and being movable such that said predetermined amount of light impinges upon successive ones of said light-measuring means, the adjustment of said biasing means to provide equal indications by said indicating means as said calibration means is moved past all of said light-measuring means insuring that said indicating means will indicate a satisfactory illumination pattern at said exposure window when said apparatus is used to align an exposure lamp assembly and all of said indications fall within said predetermined minimum and maximum bounds.

40. Apparatus in accordance with claim 39 further including mask means having differently shaded regions positionable between said calibration means and said light-measuring means, a respective shaded region being provided for each of said light-measuring means for enabling calibration of said apparatus so that said apparatus can thereafter be used to indicate a balanced light intensity pattern at said exposure window when in fact no such balance exists to compensate for an imbalance in another part of the copying machine whose exposure lamp assembly is being aligned.

41. Apparatus in accordance with claim 25 wherein each of said indicating means includes biasing means for enabling an offset to be introduced in the indication of each of the indicating means.

42. Apparatus in accordance with claim 41 wherein said copying machine is elongated and when fully assembled includes said exposure lamp assembly disposed at one end thereof and a paper compartment disposed at the other end thereof, said fixture being mounted in said copying machine in said paper compartment prior to the assembly thereof during the production of said machine, and said plurality of indicating means are disposed above said machine at that end containing said exposure lamp assembly such that an operator adjusting said exposure lamp assembly can view said plurality of indicating means directly thereabove.

43. Apparatus in accordance with claim 25 wherein said copying machine is elongated and when fully assembled includes said exposure lamp assembly disposed at one end thereof and a paper compartment disposed at the other end thereof, said fixture being mounted in said copying machine in said paper compartment prior to the assembly thereof during the production of said machine, and said plurality of indicating means are disposed above said machine at that end containing said exposure lamp assembly such that an operator adjusting said exposure lamp assembly can view said plurality of indicating means directly thereabove.

* * * * *